(12) United States Patent
Nam

(10) Patent No.: US 10,858,092 B2
(45) Date of Patent: Dec. 8, 2020

(54) FLYING OBJECT

(71) Applicant: Yang Woo Nam, Seoul (KR)

(72) Inventor: Yang Woo Nam, Seoul (KR)

( * ) Notice: Subject to any disclaimer, the term of this patent is extended or adjusted under 35 U.S.C. 154(b) by 156 days.

(21) Appl. No.: 15/770,254

(22) PCT Filed: Oct. 28, 2016

(86) PCT No.: PCT/KR2016/012249
§ 371 (c)(1),
(2) Date: Apr. 23, 2018

(87) PCT Pub. No.: WO2017/078330
PCT Pub. Date: May 11, 2017

(65) Prior Publication Data
US 2018/0312246 A1    Nov. 1, 2018

(30) Foreign Application Priority Data

Nov. 5, 2015    (KR) .................... 10-2015-0155253

(51) Int. Cl.
*B64C 27/20*    (2006.01)
*B64C 27/08*    (2006.01)
(Continued)

(52) U.S. Cl.
CPC ............ *B64C 27/08* (2013.01); *B64C 11/001* (2013.01); *B64C 15/12* (2013.01); *B64C 27/20* (2013.01);
(Continued)

(58) Field of Classification Search
CPC ......... B64C 27/20; B64C 27/52; B64C 27/08; B64C 11/001; B64C 29/0033; B64C 37/00; B60F 5/02
See application file for complete search history.

(56) References Cited

U.S. PATENT DOCUMENTS 3,176,774 A * 4/1965 Krinsky ................. B64C 27/52
                                                416/130
5,505,407 A * 4/1996 Chiappetta .......... B64C 29/0025
                                                244/2
(Continued)

FOREIGN PATENT DOCUMENTS

EP           3549858 A1 * 10/2019  ........... B64C 11/007
KR    10-2000-0067382 A    11/2000
(Continued)

*Primary Examiner* — Philip J Bonzell
(74) *Attorney, Agent, or Firm* — Patent Office of Dr. Chung Park

(57) ABSTRACT

A flying object according to the present invention has been developed to have a plurality of rotor blades or jet engines, and to reduce the risk of a crash even if any one of the rotor blades or jet engines is damaged. The flying object comprises: a flying fuselage; a plate-shaped protection member having a plurality of through-holes formed on the same circumference thereof; a driving means arranged in each of the through-holes; and a tilting means for tilting each of the driving means, or a rotating means for rotating the protection member around a shaft member, wherein the diameter of the protection member, the interval between the rotational axes of the rotor blades facing each other, the length of the shaft member, and the length of the flying fuselage have a predetermined ratio.

6 Claims, 20 Drawing Sheets

(51) Int. Cl.
   *B64D 27/24*   (2006.01)
   *B64C 29/00*   (2006.01)
   *B64C 11/00*   (2006.01)
   *B64C 15/12*   (2006.01)
   *B64C 27/52*   (2006.01)
   *B64D 27/16*   (2006.01)
   *B64D 27/26*   (2006.01)

(52) U.S. Cl.
   CPC .......... *B64C 27/52* (2013.01); *B64C 29/0033* (2013.01); *B64D 27/16* (2013.01); *B64D 27/24* (2013.01); *B64D 27/26* (2013.01)

(56) References Cited

U.S. PATENT DOCUMENTS

| | | | | |
|---|---|---|---|---|
| 5,746,390 A | * | 5/1998 | Chiappetta | B64C 29/0025 244/12.2 |
| 6,138,943 A | * | 10/2000 | Huang | B60F 5/02 244/17.25 |
| 7,149,611 B2 | * | 12/2006 | Beck | B60K 17/046 701/2 |
| 9,896,199 B2 | * | 2/2018 | Foskey | B64C 27/72 |
| 2004/0167682 A1 | * | 8/2004 | Beck | B60T 1/062 701/3 |
| 2013/0206919 A1 | * | 8/2013 | Shachor | B64C 39/024 244/23 A |
| 2013/0214088 A1 | * | 8/2013 | Shachor | B64C 39/022 244/17.17 |
| 2019/0322368 A1 | * | 10/2019 | Melcher | B64C 3/38 |

FOREIGN PATENT DOCUMENTS

| | | |
|---|---|---|
| KR | 10-2011-0032974 A | 3/2011 |
| KR | 10-2011-0055842 A | 5/2011 |
| KR | 10-1129249 B1 | 6/2012 |
| KR | 10-2012-0136797 A | 12/2012 |
| WO | WO-2017172402 A1 * | 10/2017 ............ B64C 27/08 |

* cited by examiner

【FIG. 1】 (PRIOR ART)
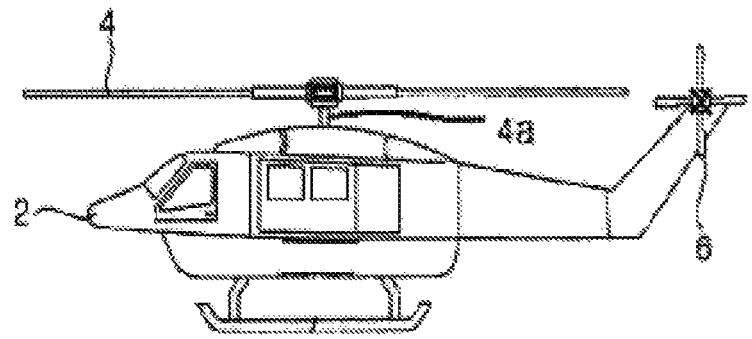
【FIG. 2】
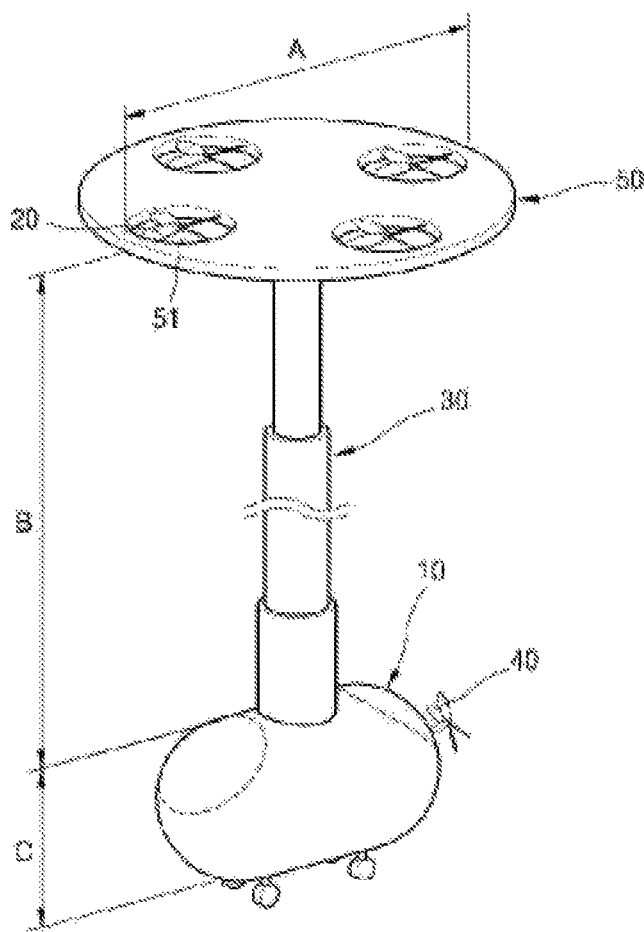

[FIG. 3]
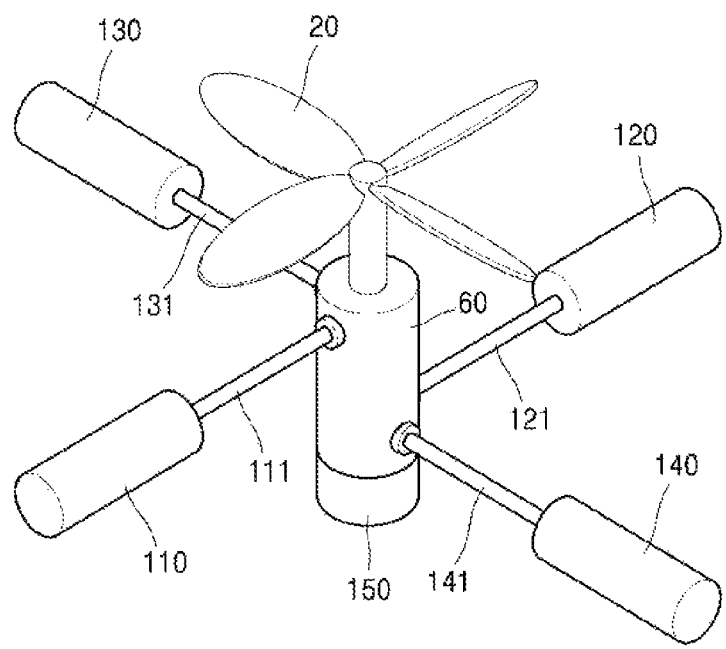

[FIG. 4]
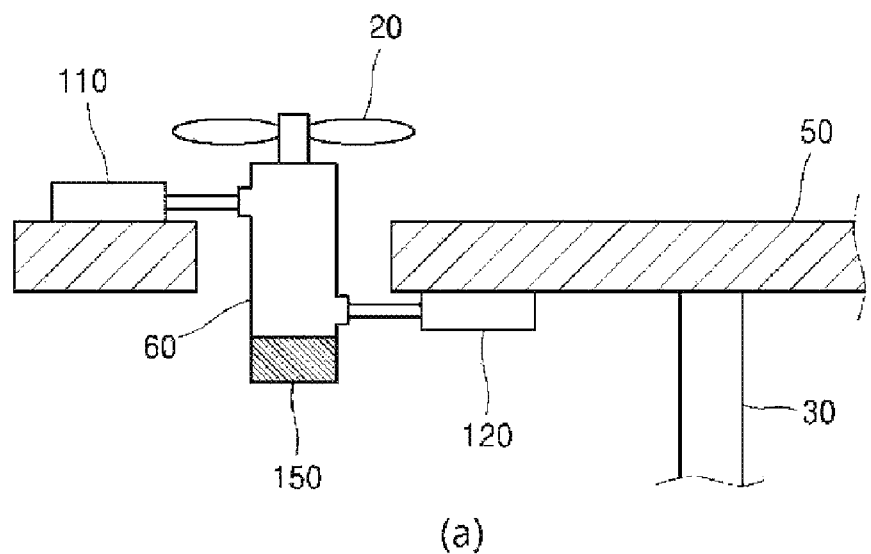
(a)
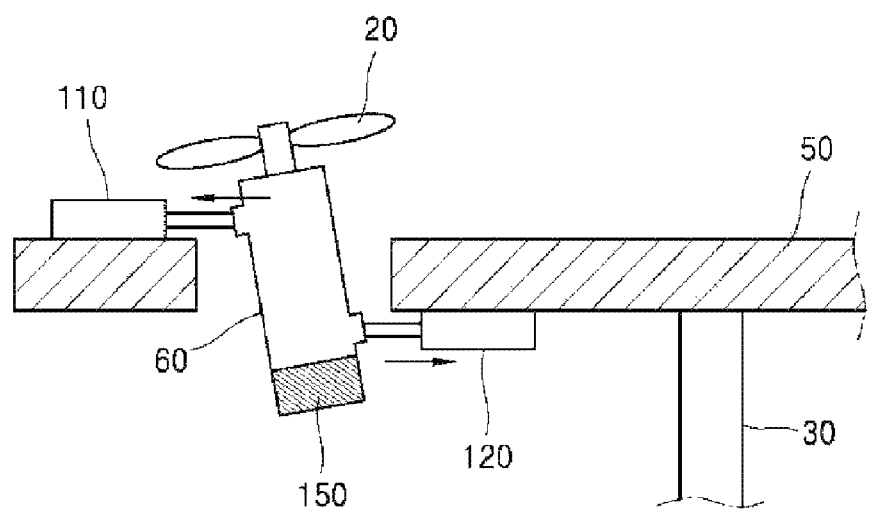
(b)

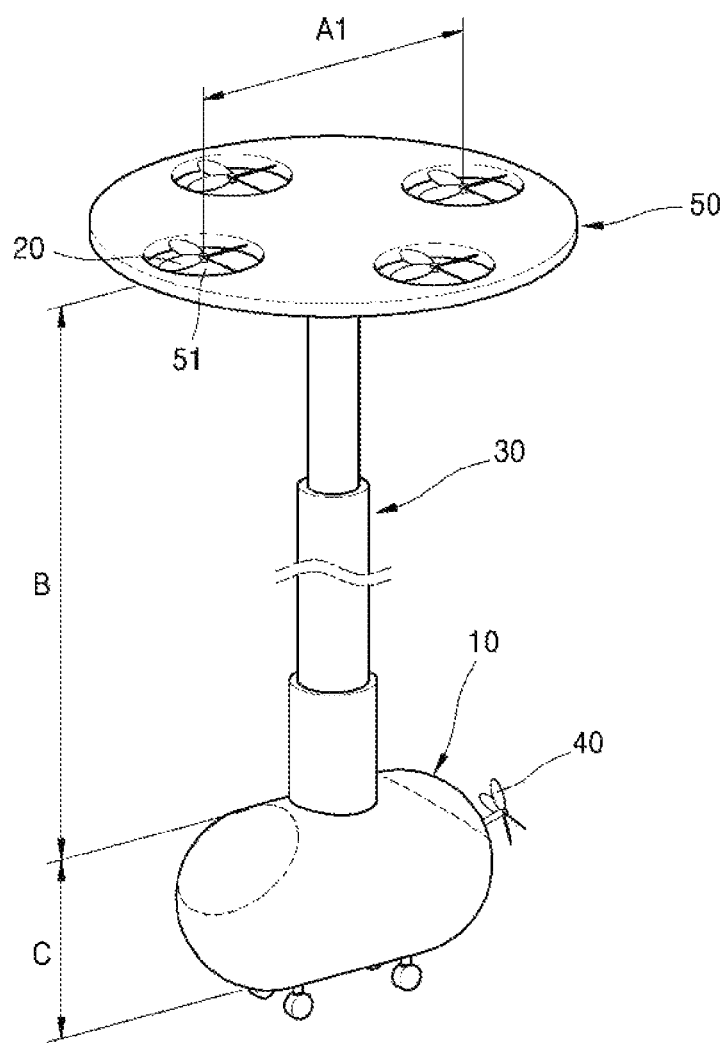
[FIG. 5]

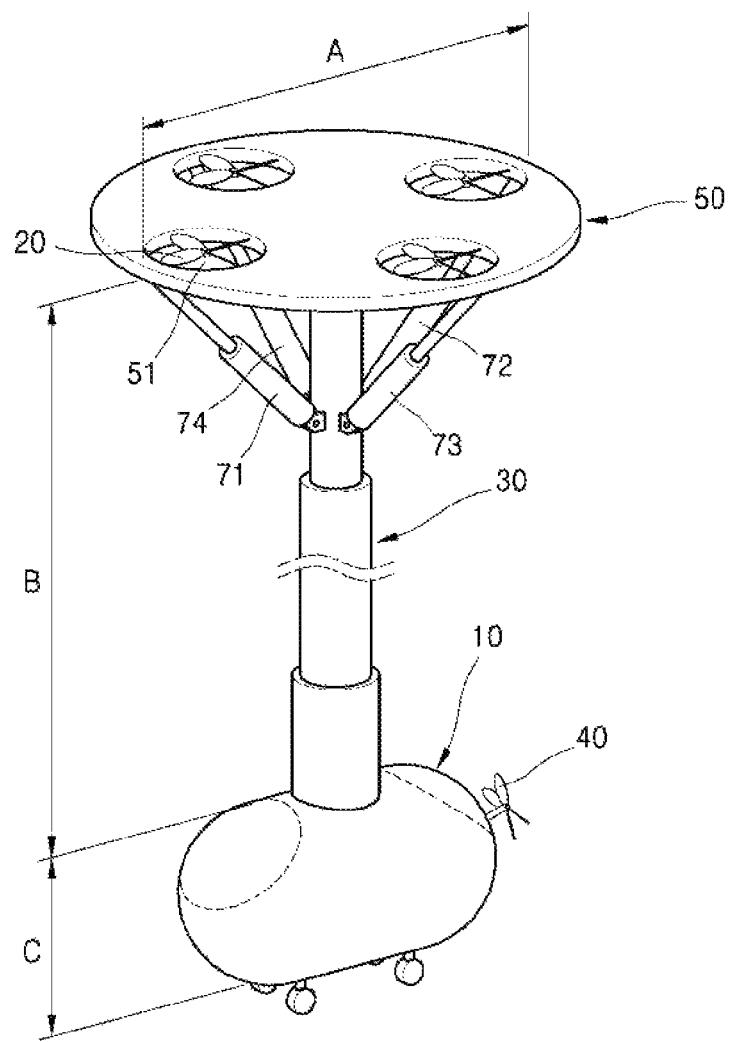
[FIG. 6]

[FIG. 7]
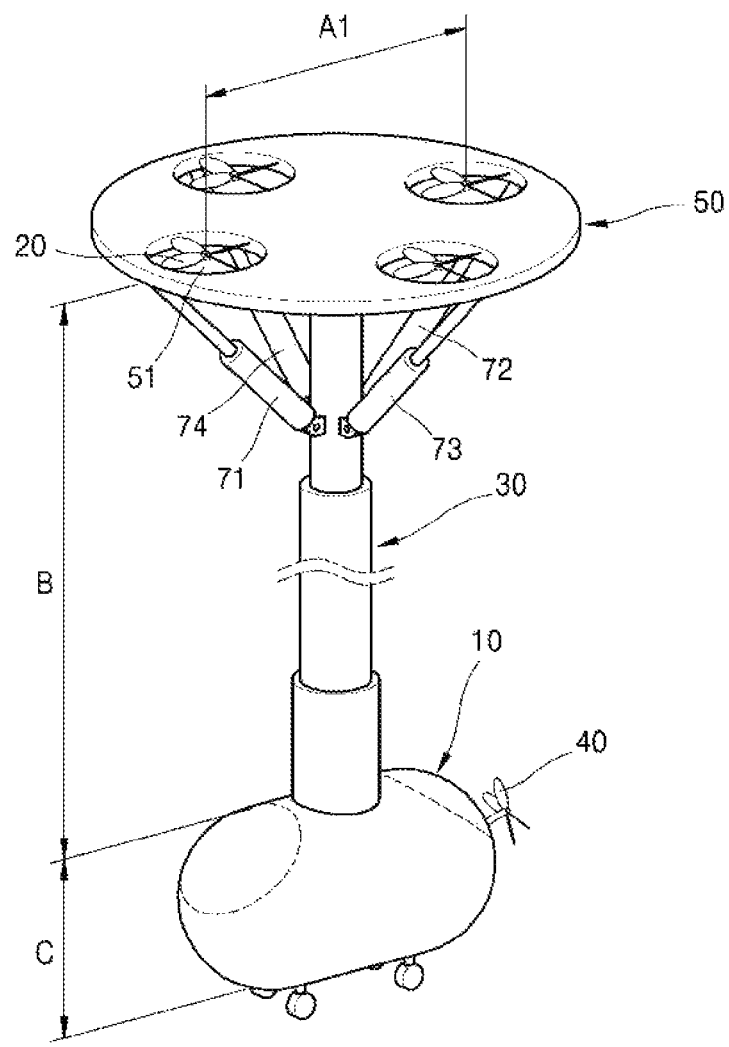

【FIG. 8】
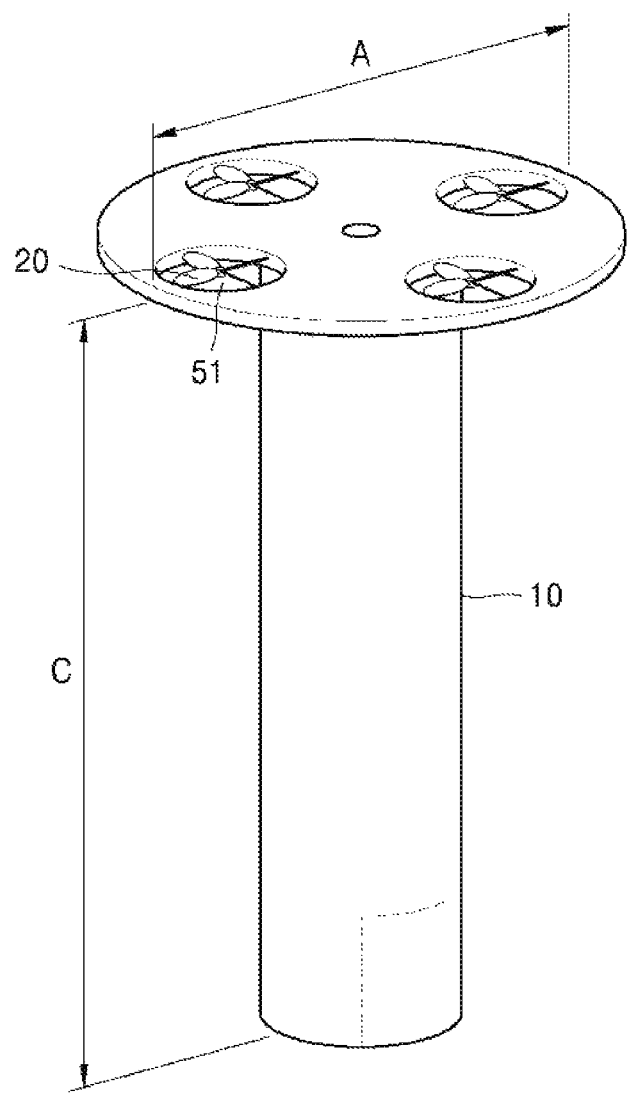

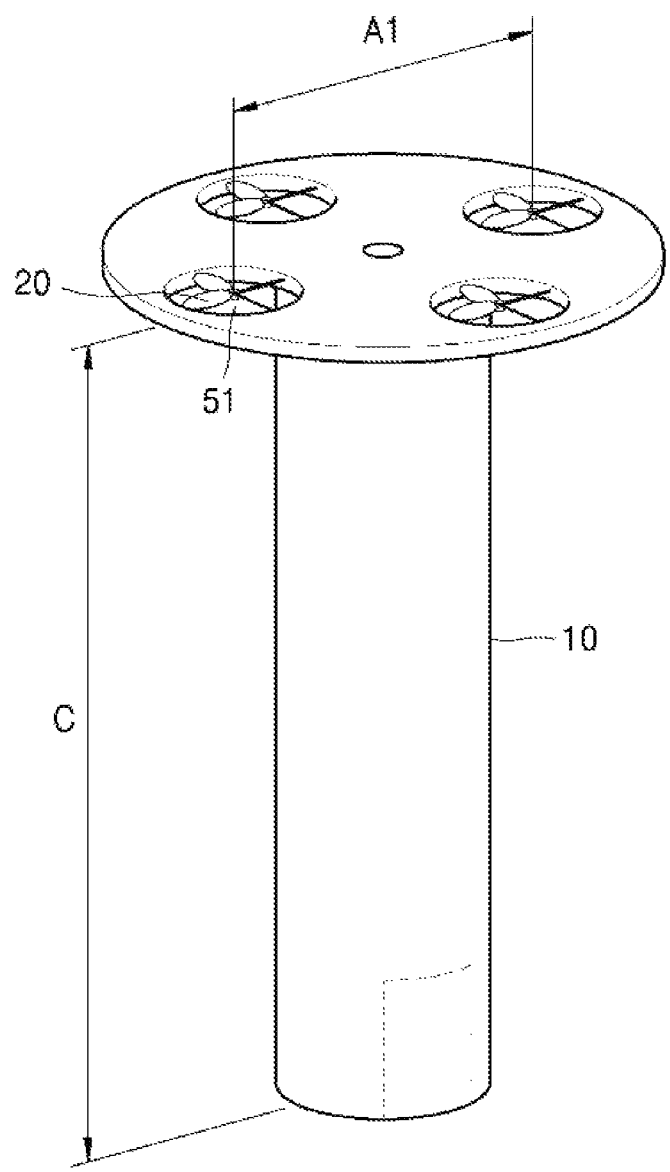
[FIG. 9]

[FIG. 10]
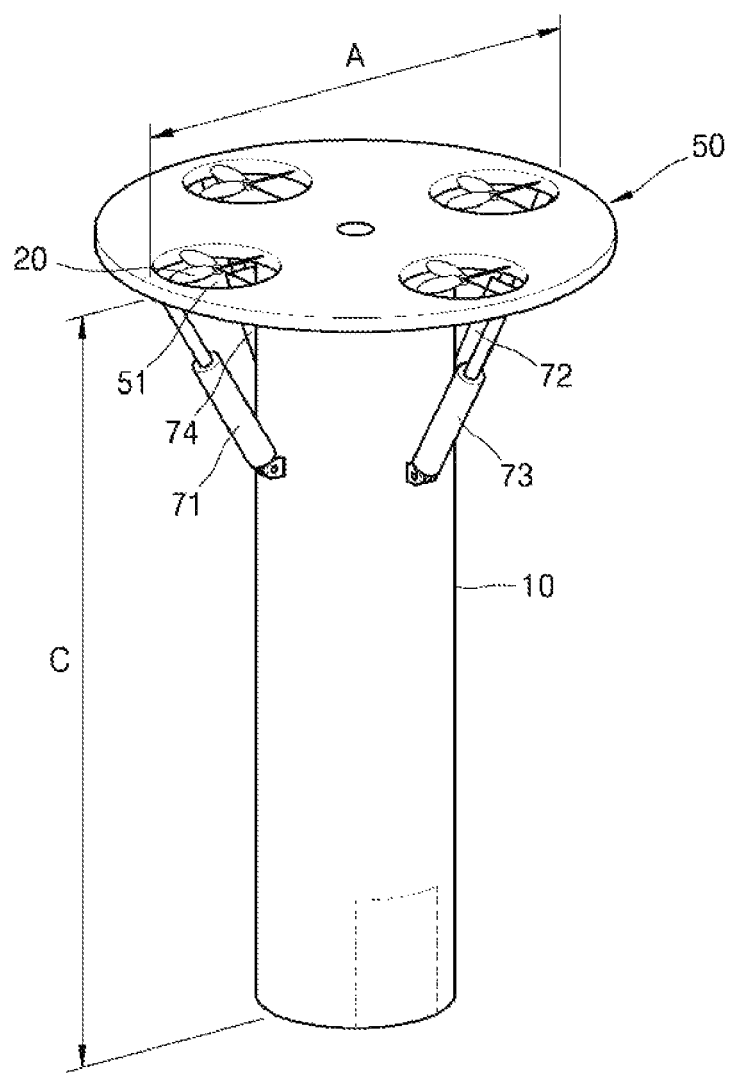

【FIG. 11】
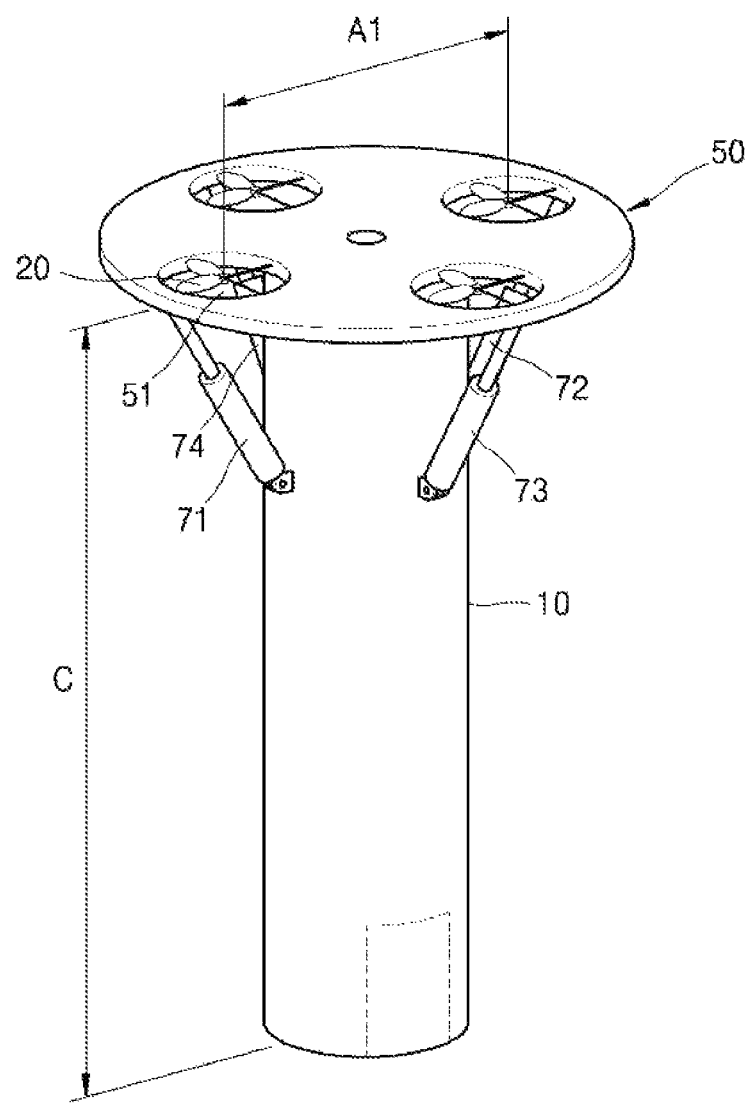

【FIG. 12】
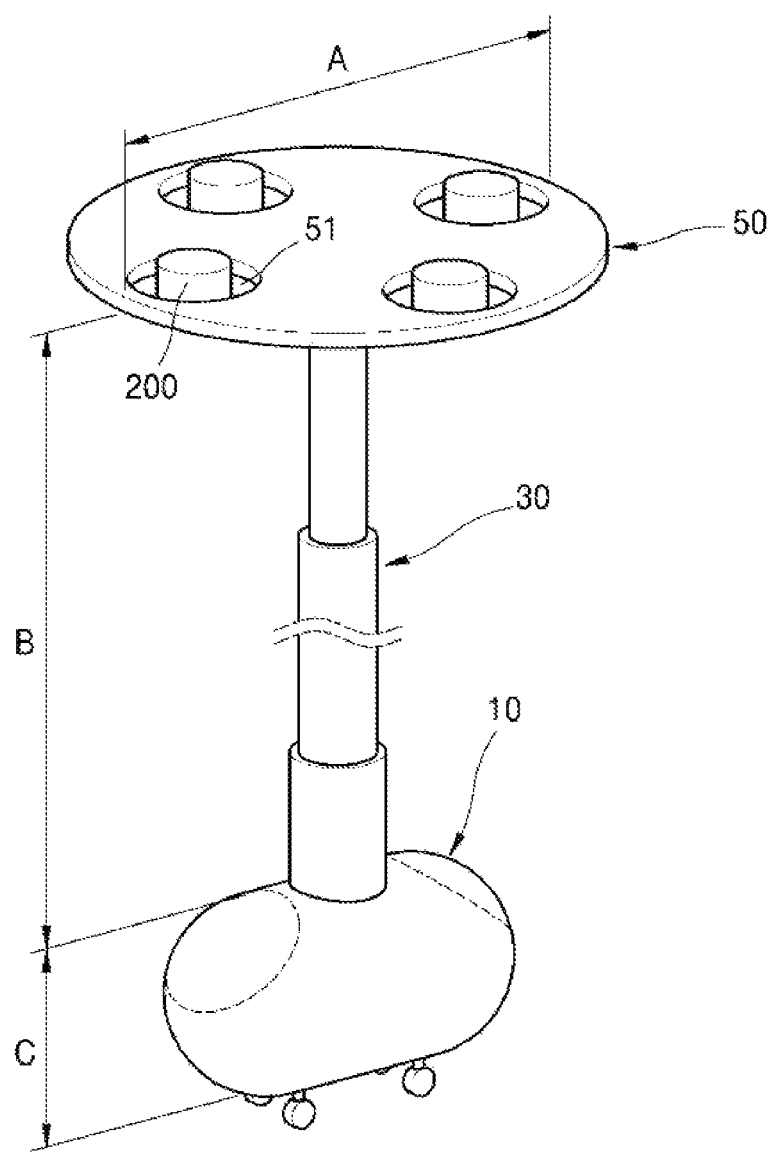

[FIG. 13]
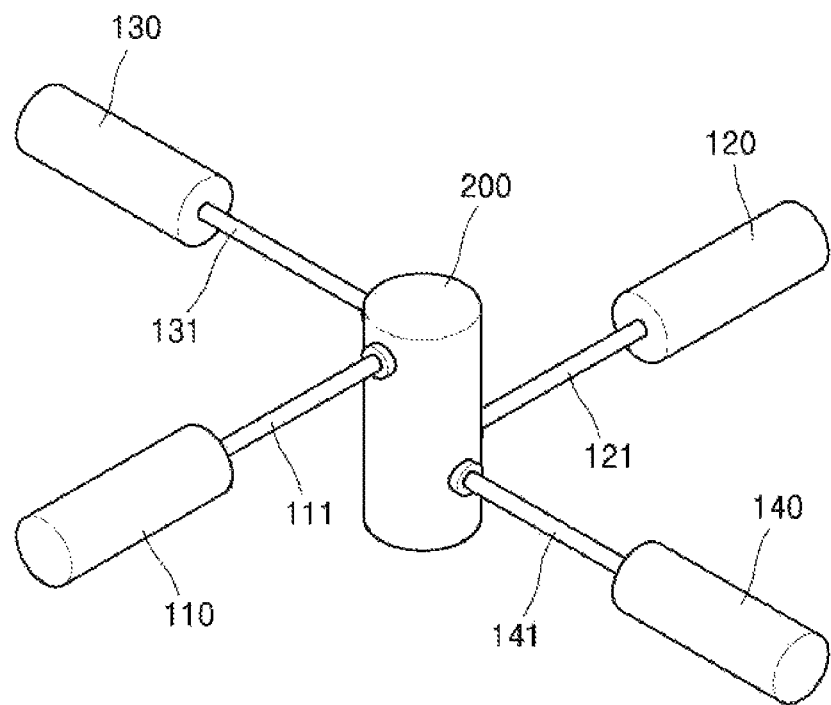

[FIG. 14]
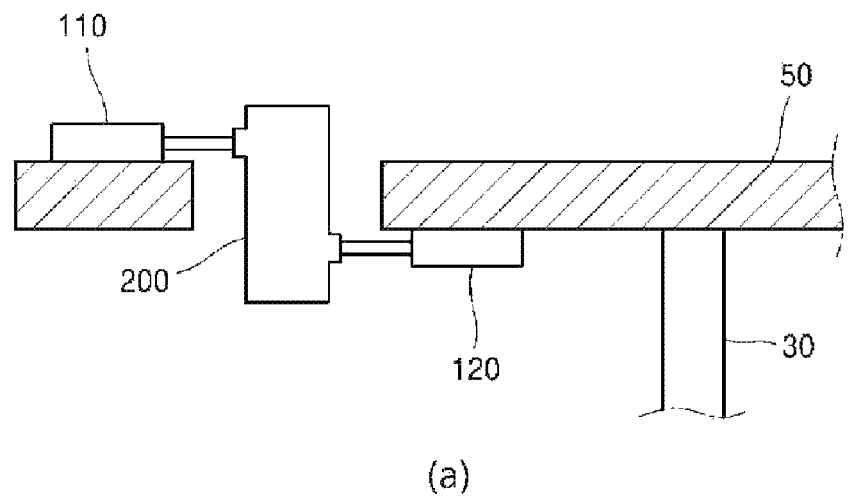
(a)
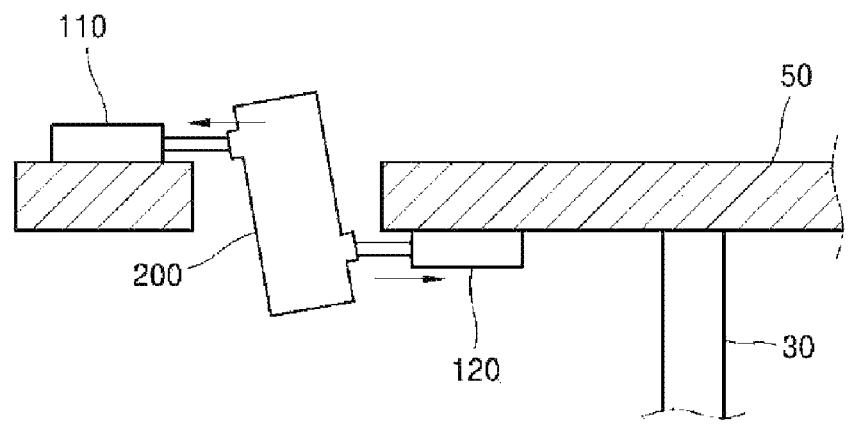
(b)

[FIG. 15]
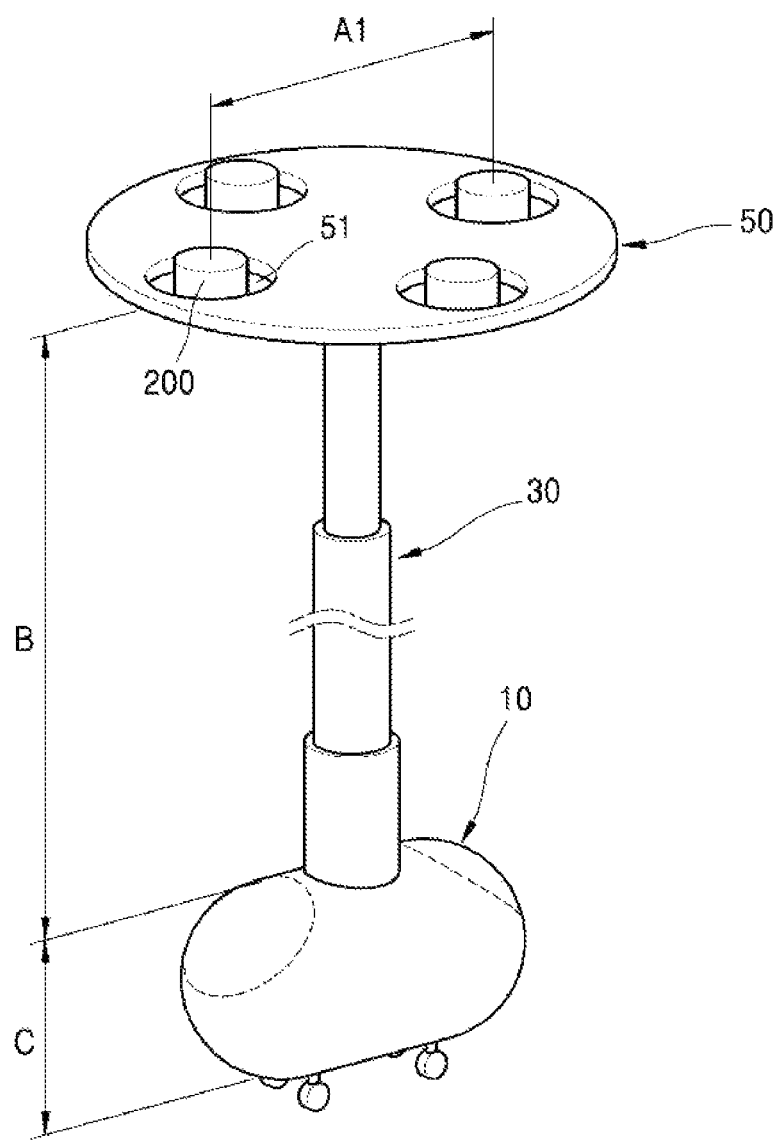

[FIG. 16]
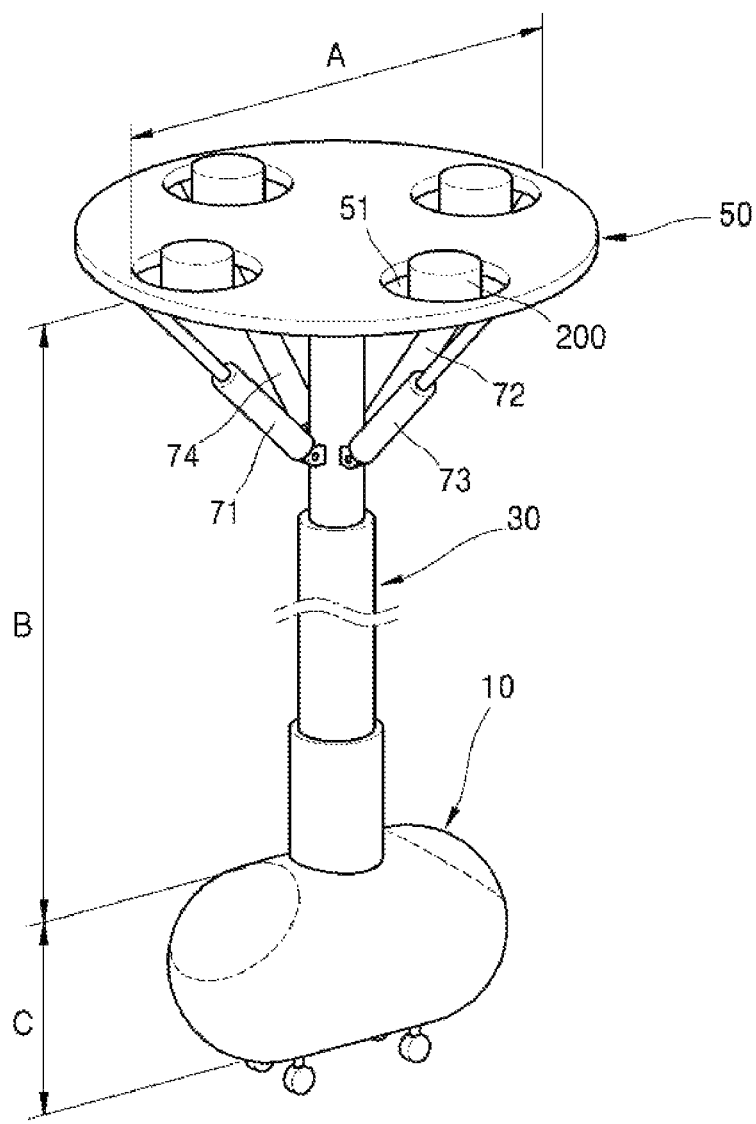

[FIG. 17]
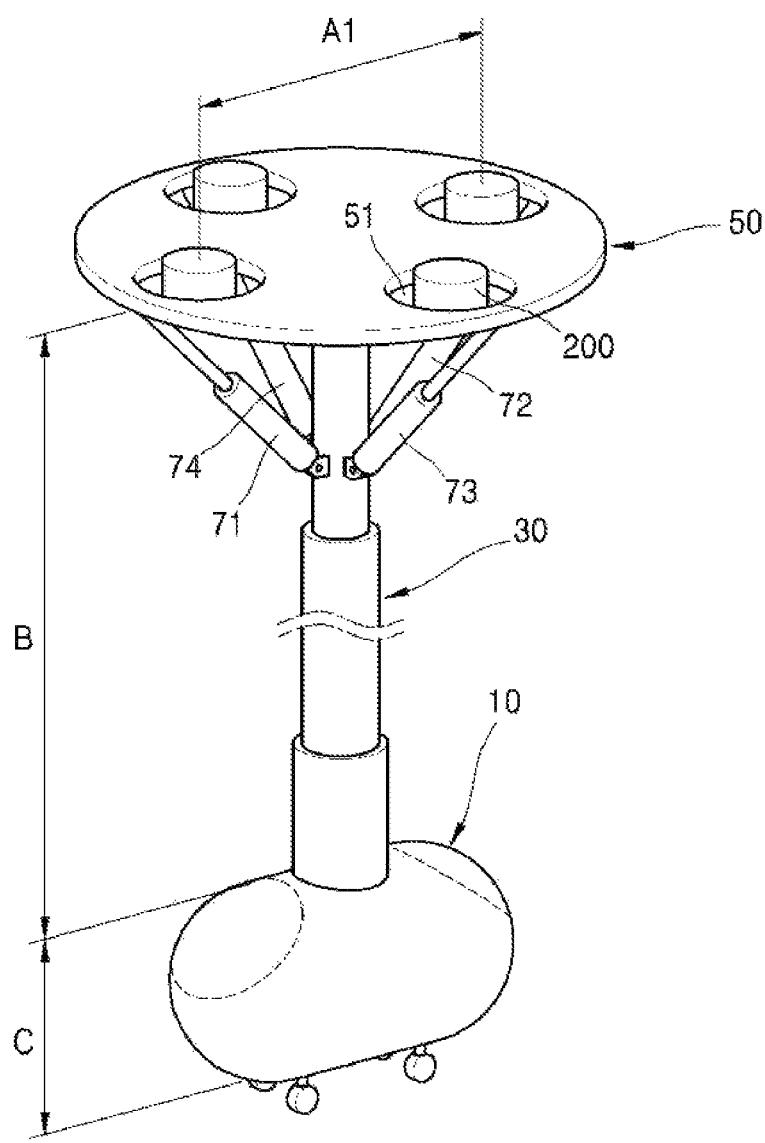

[FIG. 18]
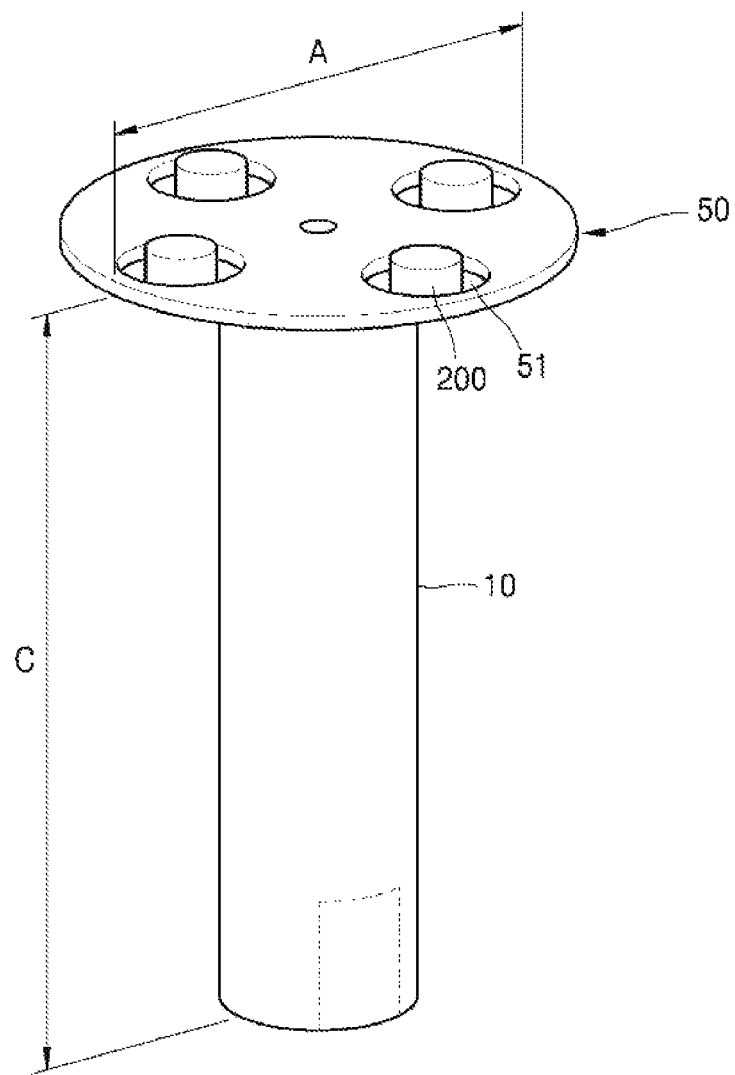

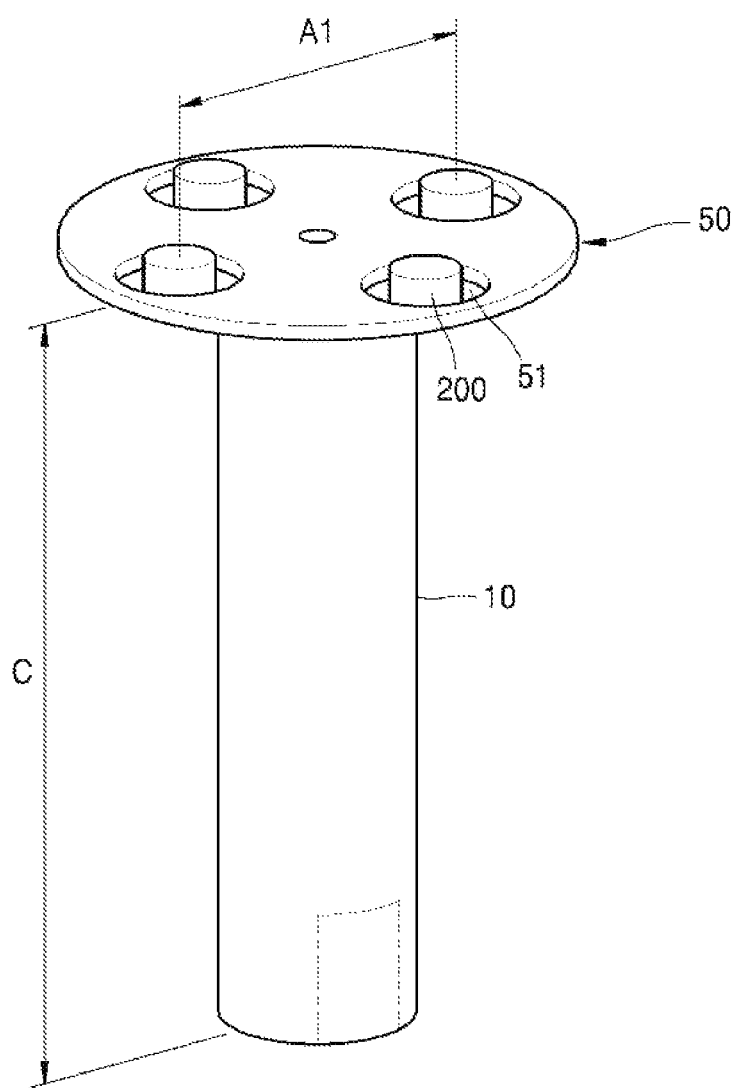
[FIG. 19]

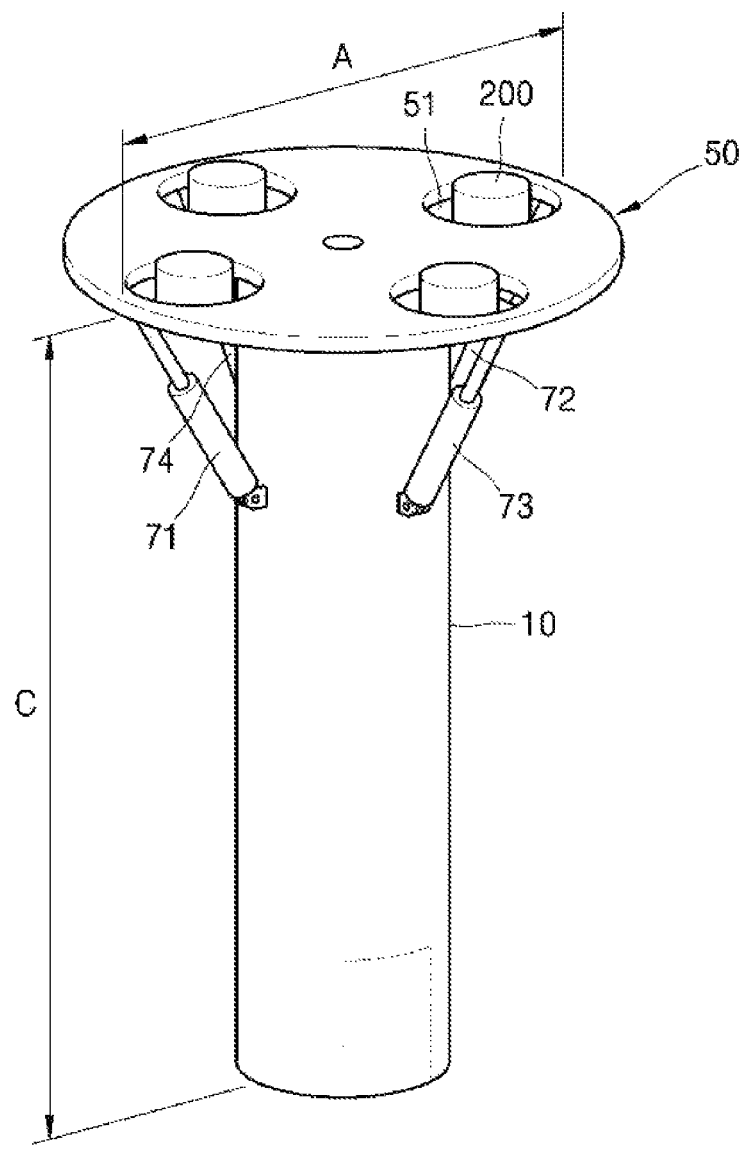
[FIG. 20]

[FIG. 21]
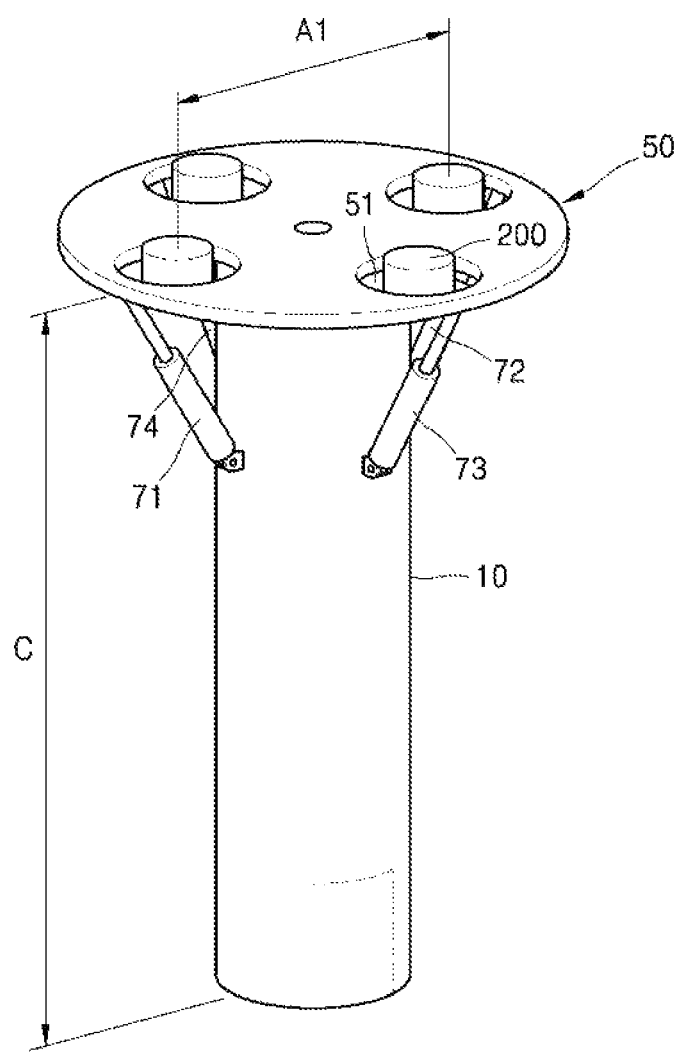

FLYING OBJECT

TECHNICAL FIELD

The present invention relates to a flying object and, more particularly, to an improved flying object, which is provided with a plurality of rotor blade unit and thus can reduce the risk of a crash even if any one of the blades is damaged, thereby improving the flight stability.

BACKGROUND ART

In general, a helicopter is an aircraft flying by lift and propulsive force generated by the flow of air passing through the surfaces of rotor blades by rotating the rotor blades with engines, and includes the rotor blades, and an engine for driving the rotor blades, a clutch for connecting or disconnecting the transmission of the rotation of the engine between the rotor blades and the engine so as to prevent the rotor blades from stopping at the same time when the engine is broken, a decelerating device for decelerating the engine rotation to the most efficient number of rotations for the rotor blades, and a control unit for controlling the engine, the rotation of the rotor blades or the angle of the blades.

FIG. 1 shows a typical one of the prior art helicopter, which includes a fuselage 2, where not only people can board but also various devices can be equipped, rotor blades 4 for lifting and propelling the fuselage 2, tail rotor blades 6 mounted on the rear portion of the fuselage 2 so as to rotate in a direction opposite to the rotation direction of the rotor blades 4, thereby preventing the fuselage 2 from being rotated by the rotor blades 4, and an engine (not shown) for driving the rotor blades 4 and the tail rotor blades 6.

However, the typical prior art helicopter has the following problems.

First, there is a problem that the length of a rotation shaft 4a is considerably short as compared with the rotation diameter of the rotor blades 4 such that the vibration transmitted to the fuselage 2 due to the rotation of the rotor blades 4 is significant, thereby lowering the boarding feeling.

Second, there is another problem that the fuselage 2 is positioned close to the position where lift is generated by the rotor blades 4 such that in the case where the rotor blades 4 are applied with a resistance from the outside and suddenly turn, the fuselage 2 also makes a sudden turn, thereby degrading flight stability.

Third, there is a further problem that only one rotor blade unit 4 is provided such that there is the risk of a crash when the rotation of the rotor blade unit 4 is stopped during the flight due to the damage, which is generated to the rotor blade unit 4 from the outside, the engine stop and the like.

DISCLOSURE

Technical Problem

The present invention has been derived to solve the above problems and has objectives as follows.

First, the present invention has an objective to provide a flying object, in which a distance between a rotor blade unit and a fuselage is formed to be relatively longer than the rotation diameter of the rotor blade unit, thereby reducing the vibration transmitted to the fuselage due to the rotation of the rotor blade unit and improving flight stability.

Second, the present invention has an objective to provide a flying object, in which a plurality of rotor blade units are provided so as to prevent the risk of a crash even if any one of the rotor blade units is damaged during the flight.

Third, the present invention has an objective to provide a flying object, in which rotor blade units in rotation can be protected from the outside.

Fourth, the present invention has an objective to provide a flying object, of which falling can be prevented even if an engine is stopped.

Technical Solution

A flying object according to an embodiment of the present invention may include: a flying fuselage; a shaft member upwardly erected with a lower end portion fixed to the flying fuselage; a plate-shaped protection member fixed at the center portion thereof to the upper end portion of the shaft member and having a plurality of through-holes formed in the same circumference thereof; each driving means arranged in each of the through-holes; and a tilting means for tilting each of the driving means with respect to the plane surface of the protection member.

Herein, if it is assumed that the diameter of the protection member is A, the interval between the rotation shafts of the rotor blade units facing each other is A1, and the length of the shaft member is B, B$\rangle$A or B$\rangle$A1 may be satisfied.

Meanwhile, if it is assumed that the height of the flying fuselage is C, B+C$\rangle$1.5A or B+C$\rangle$1.5A1 may be satisfied.

Herein, the shaft member may be formed from an expandable telescopic cylinder.

According to another embodiment, in which a vertically elongated flying fuselage is provided instead of omitting the shaft member, a flying object according to this embodiment of the present invention includes: a flying fuselage; a protection member fixed on the upper end portion of the flying fuselage and having a plurality of through-holes formed in the same circumference thereof; each driving means arranged in each of the through-holes; and a tilting means for tilting each of the driving means with respect to the plane surface of the protection member.

Herein, if it is assumed that the diameter of the protection member is A, the interval between the rotation shafts of the rotor blade units facing each other is A1, and the length of the fuselage is C, formula C$\rangle$1.5A or C$\rangle$1.5A1 may be satisfied.

In the above two embodiments, the driving means may be a jet engine or a rotor blade unit, and the through-holes and the driving means may be arranged such that four or more of the through-holes and four or more of the driving means are arranged at equal intervals respectively.

In the above two embodiments, if the driving means is a rotor blade unit, each of the tilting means may include: a boss for rotatably coupling the rotation shaft of the rotor blade unit; a first actuator mounted on the top surface portion of the protection member and having a first rod capable of protruding and retracting with a free end portion rotatably coupled to the outer surface of the boss; a second actuator mounted on the bottom surface portion of the protection member at the opposite side of the first actuator and having a second rod capable of protruding and retracting with a free end portion rotatably coupled to the outer surface of the boss; a third actuator mounted on the top surface portion of the protection member at a right angle position with respect to the first actuator and having a third rod capable of protruding and retracting with a free end portion rotatably coupled to the outer surface of the boss; and a fourth actuator mounted on the bottom surface portion of the protection member at the opposite side of the third actuator and having a fourth rod capable of protruding and retracting with a free end portion rotatably coupled to the outer surface of the boss, wherein the boss is tilted by the operations of the third and fourth actuators or the first and second actuators with respect to the first and second rods or the third and fourth rods such that the rotor blade unit can be tilted.

In the above two embodiments, if the driving means is a jet engine, each of the tilting means may include: a first actuator mounted on the top surface portion of the protection member and having a first rod capable of protruding and retracting with a free end portion rotatably coupled to the outer surface of the jet engine; a second actuator mounted on the bottom surface portion of the protection member at the opposite side of the first actuator and having a second rod capable of protruding and retracting with a free end portion rotatably coupled to the outer surface of the jet engine; a third actuator mounted on the top surface portion of the protection member at a right angle position with respect to the first actuator and having a third rod capable of protruding and retracting with a free end portion rotatably coupled to the outer surface of the jet engine; and a fourth actuator mounted on the bottom surface portion of the protection member at the opposite side of the third actuator and having a fourth rod capable of protruding and retracting with a free end portion rotatably coupled to the outer surface of the jet engine, wherein the jet engine may be tilted with respect to the protection member by the operations of the third and fourth actuators or the first and second actuators with respect to the first and second rods or the third and fourth rods.

Meanwhile, according to still another embodiment, in which a rotation means is provided instead of a tilting means, a flying object according to this embodiment of the present invention includes: a flying fuselage; a shaft member upwardly erected with a lower end portion fixed to the flying fuselage; a plate-shaped protection member fixed at the center portion thereof to the upper end portion of the shaft member and having a plurality of through-holes formed in the same circumference thereof; each driving means arranged in each of the through-holes; and a rotation means for rotating the protection member with respect to the shaft member.

Herein, if it is assumed that the diameter of the protection member is A, the interval between the rotation shafts of the rotor blade units facing each other is A1, and the length of the shaft member is B, formula B⟩A or B⟩A1 may be satisfied, and if it is assumed that the height of the flying fuselage is C, formula B+C⟩1.5A or B+C⟩1.5A1 may be satisfied.

Also, the shaft member may be formed from an expandable telescopic cylinder.

According to a further embodiment, in which a vertically elongated flying fuselage is provided instead of omitting the shaft member, a flying object according to this embodiment of the present invention includes: a flying fuselage; a protection member fixed on the upper end portion of the flying fuselage and having a plurality of through-holes formed in the same circumference thereof; each driving means arranged in each of the through-holes; and a rotation means for rotating the protection member with respect to the flying fuselage, wherein if it is assumed that the diameter of the protection member is A, the interval between the rotation shafts of the rotor blade units facing each other is A1, and the length of the fuselage is C, formula C⟩1.5A or C⟩1.5A1 may be satisfied.

In the last two embodiments, the driving means may be a jet engine or a rotor blade unit, and the through-holes and the driving means may be arranged such that four or more of the through-holes and four or more of the driving means are arranged at equal intervals respectively.

In the last two embodiments, the rotation means may include: a first cylinder fixed on the shaft member and having a first rod rotatably coupled to the bottom surface of the protection member with an end portion thereof; a second cylinder fixed on the shaft member at a position facing the first cylinder and having a second rod rotatably coupled to the bottom surface of the protection member with an end portion thereof; a third cylinder fixed on the shaft member at a right angle position with respect to the first cylinder and having a third rod coupled to the bottom surface of the protection member with an end portion thereof; and a fourth cylinder fixed on the shaft member at a position facing the third cylinder and having a fourth rod rotatably coupled to the bottom surface of the protection member with an end portion thereof.

Advantageous Effects

First, according to the flying object of the present invention, the length of the shaft member is formed to be relatively longer than the rotation diameter of the rotor blade unit so that the vibration transmitted to the flying fuselage according to the rotation of the rotor blade unit is reduced as compared with that of the prior art flying object, and the heavy flying fuselage where passengers and an equipped engine are located is positioned below the rotor blade units with an interval equal to or larger than the rotation diameter of the rotor blade units so that the flight stability is improved.

Second, the shaft member is formed as a telescopic cylinder so as to be expandable, so that the flying object can maintain a stable stopping posture so as to enter the hangar after landing.

Third, a storage battery capable of storing the electricity generated from the engine is provided so as to drive the rotor blade unit and the tail rotor by the storage battery when the engine is unexpectedly stopped during the flight, thereby preventing the risk of a crash.

Fourth, the plurality of rotor blade units are provided so that it is possible to prevent the risk of a crash even if any one of the rotor blade units is damaged during the flight, and the rotating rotor blade unit can be protected by the protection member from external force and thus prevented from being damaged, thereby preventing the risk of a crash.

DESCRIPTION OF DRAWINGS

FIG. 1 is a schematic view showing an example of the prior art flying object,

FIG. 2 is a schematic view showing a flying object according to the first embodiment of the present invention, FIG. 3 is a perspective view showing the main parts of FIG. 2, FIG. 4(a) and FIG. 4(b) are views showing the operation states of the main parts of the flying object according to the first embodiment of the present invention, FIG. 5 is a schematic perspective view showing a flying object according to the second embodiment of the present invention, FIG. 6 is a schematic perspective view showing a flying object according to the third embodiment of the present invention, FIG. 7 is a schematic perspective view showing a flying object according to the fourth embodiment of the present invention, FIG. 8 is a schematic perspective view showing a flying object according to the fifth embodiment of the present invention, FIG. 9 is a schematic perspective view showing a flying object according to the sixth embodiment of the present invention, FIG. 10 is a schematic perspective view showing a flying object according to the seventh embodiment of the present invention, FIG. 11 is a schematic perspective view showing a flying object according to the eighth embodiment of the present invention, FIG. 12 is a schematic perspective view showing a flying object according to the ninth embodiment of the present invention, FIG. 13 is a perspective view showing the main parts of FIG. 12, FIG. 14(a) and FIG. 14(b) are views showing the operation states of the main parts of the flying object according to the ninth embodiment of the present invention, FIG. 15 is a schematic perspective view showing a flying object according to the tenth embodiment of the present invention, FIG. 16 is a schematic perspective view showing a flying object according to the eleventh embodiment of the present invention, FIG. 17 is a schematic perspective view showing a flying object according to the twelfth embodiment of the present invention, FIG. 18 is a schematic perspective view showing a flying object according to the thirteenth embodiment of the present invention, FIG. 19 is a schematic perspective view showing a flying object according to the fourteenth embodiment of the present invention, FIG. 20 is a schematic perspective view showing a flying object according to the fifteenth embodiment of the present invention, and FIG. 21 is a schematic perspective view showing a flying object according to the sixteenth embodiment of the present invention.

BEST MODE FOR CARRYING OUT THE INVENTION

A flying object according to the present invention has been developed to locate a flying fuselage at a position lower than that of a rotor blade unit or a jet engine with a considerable interval therebetween, thereby improving the flight stability, and provide a plurality of rotor blade units and jet engines, thereby reducing the risk of a crash even if any one of the rotor blade units or jet engines is damaged.

Embodiment 1

A flying object according to the first embodiment of the present invention, as shown in FIG. 2 to FIG. 4, includes a flying fuselage 10 with passengers on board and an engine equipped (not shown), a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, a plurality of rotor blade units 20 respectively arranged in each of the through-holes 51 so as to be driven to rotate by the power of the engine, and a tilting means for tilting each of the rotor blade units 20 with respect to the plane surface of the protection member 50.

Herein, if it is assumed that the diameter of the protection member 50 is A and the length of the shaft member 30 is B, B⟩A and thus the length of the shaft member 30 is formed to be relatively longer than the diameter of the protection member 50.

In addition, if it is assumed that the height of the flying fuselage 10 is C, B+C⟩1.5A.

In this case, the length of the shaft member 30 is formed to be longer than the diameter of the protection member 50 so that the vibration transmitted to the flying fuselage 10 according to the rotation of the rotor blade unit 20 is reduced as compared with that of the prior art flying object, and the heavy flying fuselage 10 where the passengers and the equipped engine are located is positioned below the rotor blade units 20 and the protection member 50 with an interval equal to or larger than the diameter of the protection member 50 so that the flight stability is improved.

In addition, the shaft member 30 is formed as a telescopic cylinder so as to be expandable, so that the flying object can maintain a stable stopping posture and enter the hangar by reducing the length of the shaft member 30 after landing.

In addition, the flying fuselage 10 is provided with a tail rotor 40, which rotates in the opposite direction to that of the rotor blade units 20.

In order to prevent the flying fuselage 10 from rotating together when the rotor blade units 20 rotate in one direction and generate lift, the tail rotor 40 rotates in the opposite direction to the rotation direction of the rotor blade units 20.

In addition, a storage battery (not shown) capable of storing the electricity generated from the engine is provided so as to drive the rotor blade units 20 and the tail rotor 40 by the storage battery when the engine is unexpectedly stopped during the flight, thereby preventing the risk of a crash.

The tilting means includes a boss 60 for rotatably coupling the rotation shaft of the rotor blade unit 20, a first actuator 110 mounted on the top surface portion of the protection member 50 and having a first rod 111 capable of protruding and retracting with a free end portion rotatably coupled to the outer surface of the boss 60, a second actuator 120 mounted on the bottom surface portion of the protection member 50 at the opposite side of the first actuator 110 and having a second rod 121 capable of protruding and retracting with a free end portion rotatably coupled to the outer surface of the boss 60, a third actuator 130 mounted on the top surface portion of the protection member 50 at a right angle position with respect to the first actuator 110 and having a third rod 131 capable of protruding and retracting with a free end portion rotatably coupled to the outer surface of the boss 60, and a fourth actuator mounted on the bottom surface portion of the protection member at the opposite side of the third actuator 130 and having a fourth rod capable of protruding and retracting with a free end portion rotatably coupled to the outer surface of the boss.

Each motor 150 for driving and rotating each of the rotor blade units 20 is mounted on the boss 60 of each of the rotor blade units 20, and each of the motors 150 is driven by the electricity, which is generated by the engine (not shown) and supplied from the storage battery (not shown).

Meanwhile, the rotor blade units 20, the motors 150, and the storage batteries are provided in four or more respectively so that stable flight can be achieved even if any one of them fails during the flight.

Referring to FIG. 4(a) and FIG. 4(b), in the tilting means described above, the rotor blade unit 50 is tilted while the boss 60 is tilted with respect to the third and fourth rods 131, 141 by the operations of the first and second actuators 110, 120, thereby generating thrust.

According to the flying object as configured above, the plurality of rotor blade units 20 are provided so that it is possible to prevent the risk of a crash even if any one of the rotor blade units 20 is damaged during the flight, and the rotating rotor blade units 20 can be protected by the protection member 50 from external force and thus prevented from being damaged, thereby preventing the risk of a crash. In addition, even if the engine is stopped, the supply of power by the storage battery is continued, thereby preventing a crash.

MODES FOR CARRYING OUT THE INVENTION

Embodiment 2

The second embodiment has the same configuration as the first embodiment. Referring to FIG. 5, the second embodiment has the characteristic configuration in that when assuming that the interval between the rotation shafts of the rotor blade units 20 facing each other is A1 and the length of the shaft member 30 is B, B⟩A1.

In addition, the second embodiment has the characteristic configuration in that when assuming that the height of the flying fuselage 10 is C, B+C⟩1.5A1.

In this case, the length of the shaft member 30 is formed to be longer than the interval A1 between the rotation shafts of the rotor blade units 20 so that the vibration transmitted to the flying fuselage 10 due to the rotation of the rotor blade units 20 is reduced as compared with that of the prior art flying object, and the heavy flying fuselage 10 where passengers and an equipped engine are located is positioned below the rotor blade units 20 and the protection member 50 with an interval equal to or larger than the interval A1 between the rotation shafts of the rotor blade units 20, thereby improving the flight stability.

Embodiment 3

A flying object according to the third embodiment of the present invention will be explained below by applying the same reference signs to the same constituent elements as those of the flying object according the first embodiment of the present invention.

Referring to FIG. 6, the flying object includes a heavy flying fuselage 10 where passengers and an engine (not shown) are located, a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, each rotor blade unit 20 arranged in each of the through-holes 51 and rotating with the power of the engine, and a rotation means for rotating the protection member 50 with respect to the shaft member 30.

Herein, if it is assumed that the diameter of the protection member 50 is A and the length of the shaft member 30 is B, then B⟩A and thus the length of the shaft member 30 is formed to be relatively longer than the diameter of the protection member 50.

In addition, if it is assumed that the height of the flying fuselage 10 is C, then B+C⟩1.5A.

In this case, the length of the shaft member 30 is formed to be long so that the vibration transmitted to the flying fuselage 10 according to the rotation of the rotor blade unit 20 is reduced as compared with that of the prior art flying object, and the heavy flying fuselage 10 where the passengers and the equipped engine are located is positioned below the rotor blade units 20 and the protection member 50 with an interval equal to or larger than the diameter of the protection member 50 so that the flight stability is improved.

In addition, the shaft member 30 is formed as a telescopic cylinder so as to be expandable, so that the flying object can maintain a stable stopping posture and enter the hangar by reducing the length of the shaft member 30 after landing.

In addition, the flying fuselage 10 is provided with a tail rotor 40, which rotates in the opposite direction to that of the rotor blade units 20, wherein in order to prevent the flying fuselage 10 from rotating together when the rotor blade units 20 rotate in one direction and generate lift, the tail rotor 40 rotates in the opposite direction to the rotation direction of the rotor blade units 20.

In addition, a storage battery (not shown) capable of storing the electricity generated from the engine is provided so as to drive the rotor blade units 20 and the tail rotor 40 by the storage battery when the engine is unexpectedly stopped during the flight, thereby preventing the risk of a crash.

Each motor (not shown) for driving and rotating each of the rotor blade units 20 is mounted on the boss 60 of each of the rotor blade units 20, and the motor is driven by the electricity, which is generated by the engine (not shown) and supplied from the storage battery (not shown).

Meanwhile, the rotor blade units 20, the motors 150, and the storage batteries are provided in four or more respectively so that stable flight can be achieved even if any one of them fails during the flight.

The rotation means includes a first cylinder 71 fixed on the shaft member 30 and having a first rod 71a rotatably coupled to the bottom surface of the protection member 50 with an end portion thereof, a second cylinder 72 fixed on the shaft member 30 at a position facing the first cylinder 71 and having a second rod 72a rotatably coupled to the bottom surface of the protection member 50 with an end portion thereof, a third cylinder 73 fixed on the shaft member 30 at a right angle position with respect to the first cylinder 71 and having a third rod 73a coupled to the bottom surface of the protection member 50 with an end portion thereof, and a fourth cylinder 74 fixed on the shaft member 30 at a position facing the third cylinder 73 and having a fourth rod 74a rotatably coupled to the bottom surface of the protection member 50 with an end portion thereof.

As the protection member 50 is rotated with respect to the shaft member 30, the rotation means is tilted by the expansion and contraction of each of the cylinders and, at this time, the rotor blade units 20 rotate and are tilted with respect to the shaft member 30, thereby generating thrust.

According to the flying object as configured above, the plurality of rotor blade units 20 are provided so that it is possible to prevent the risk of a crash even if any one of the rotor blade units 20 is damaged during the flight, and the rotating rotor blade units 20 can be protected by the protection member 50 from external force and thus prevented from being damaged, thereby preventing the risk of a crash. In addition, even if the engine is stopped, the supply of power by the storage battery is continued, thereby preventing a crash.

Embodiment 4

The fourth embodiment has the same configuration as the third embodiment. Referring to FIG. 7, the fourth embodiment has the characteristic configuration in that when assuming that the interval between the rotation shafts of the rotor blade units 20 facing each other is A1 and the length of the shaft member 30 is B⟩A1.

In addition, the fourth embodiment has the characteristic configuration in that when assuming that the height of the flying fuselage 10 is C, B+C⟩1.5A1.

In this case, the length of the shaft member 30 is formed to be longer than the interval A1 between the rotation shafts of the rotor blade units 20 so that the vibration transmitted to the flying fuselage 10 due to the rotation of the rotor blade units 20 is reduced as compared with that of the prior art flying object, and the heavy flying fuselage 10 where passengers and an equipped engine are located is positioned below the rotor blade units 20 and the protection member 50 with an interval equal to or larger than the interval A1 between the rotation shafts of the rotor blade units 20, thereby improving the flight stability.

Embodiment 5

A flying object according to the fifth embodiment of the present invention, as shown in FIG. 8, includes: a flying fuselage 10 with passengers on board and an engine equipped (not shown), which is formed to be vertically elongated; a protection member 50 fixed on the upper end portion of the flying fuselage 10 and having a plurality of through-holes 51 formed in the same circumference thereof; each rotor blade unit 20 arranged in each of the through-holes 51 and rotating with the power of the engine; and a tilting means for tilting each of the rotor blade unit 20 with respect to the plane surface of the protection member 50.

The fifth embodiment has the characteristic configuration in that the flying fuselage 10 with passengers on board and the engine equipped is directly connected to the protection member 50 and when assuming that the diameter of the protection member is A and the length of the flying fuselage is C, C⟩1.5A.

In this case, the length of the flying fuselage 10 is formed to be longer than the diameter of the protection member 50 so that the vibration transmitted to the flying fuselage 10 due to the rotation of the rotor blade units 20 is reduced as compared with that of the prior art flying object, and the heavy flying fuselage 10 where passengers and an equipped engine are located is positioned below the rotor blade units 20 and the protection member 50 with an interval equal to or larger than the diameter of the protection member 50, thereby improving the flight stability.

Particularly, since the ceiling of the flying fuselage 10 is formed to be high, it is advantageous to install a sound absorbing material (not shown) and to secure a boarding space for passengers standing.

The tilting means and the rest of the configuration are the same as those of the first embodiment, and the detailed description thereof will be omitted.

Embodiment 6

A flying object according to the sixth embodiment of the present invention, as shown in FIG. 9, includes: a flying fuselage 10 with passengers on board and an engine equipped, which is formed to be vertically elongated; a protection member 50 fixed on the upper end portion of the flying fuselage 10 and having a plurality of through-holes 51 formed in the same circumference thereof; each rotor blade unit 20 arranged in each of the through-holes 51 and rotating with the power of the engine; and a tilting means for tilting each of the rotor blade unit 20 with respect to the plane surface of the protection member 50.

The sixth embodiment has the characteristic configuration in that the flying fuselage 10 with passengers on board and the engine equipped is directly connected to the protection member 50 and when assuming that the interval between the rotation shafts of the rotor blade units 20 facing each other is A1 and the length of the flying fuselage 10 is C, C⟩1.5A1.

In this case, the length of the flying fuselage 10 is formed to be longer than the diameter of the protection member 50 so that the vibration transmitted to the flying fuselage 10 due to the rotation of the rotor blade units 20 is reduced as compared with that of the prior art flying object, and the heavy flying fuselage 10 where passengers and an equipped engine are located is positioned below the rotor blade units 20 and the protection member 50 with an interval equal to or larger than the interval A1 between the rotation shafts of the rotor blade units 20, thereby improving the flight stability.

Particularly, since the ceiling of the flying fuselage 10 is formed to be high, it is advantageous to install a sound absorbing material (not shown) and to secure a boarding space for passengers standing.

The tilting means and the rest of the configuration are the same as those of the first embodiment, and the detailed description thereof will be omitted.

Embodiment 7

A flying object according to the seventh embodiment of the present invention, as shown in FIG. 10, includes: a flying fuselage 10 with passengers on board and an engine equipped; a protection member 50 fixed on the upper end portion of the flying fuselage 10 and having a plurality of through-holes 51 formed in the same circumference thereof; each rotor blade unit 20 arranged in each of the through-holes 51 and rotating with the power of the engine; and a rotation means for rotating the protection member 50 with respect to the flying fuselage 10.

Herein, if it is assumed that the diameter of the protection member 50 is A and the length of the flying fuselage 10 is C, then C⟩1.5A, and the seventh embodiment has the characteristic configuration in that the flying fuselage 10 with passengers on board and the engine equipped is directly connected to the protection member 50.

In this case, the length C of the flying fuselage 10 is formed to be longer than the diameter A of the protection member 50 so that the vibration transmitted to the flying fuselage 10 due to the rotation of the rotor blade units 20 is reduced as compared with that of the prior art flying object, and the ceiling of the flying fuselage 10 is formed to be high such that it is advantageous to install a sound absorbing material (not shown) and to secure a boarding space for passengers standing.

The rotation means includes a first cylinder 71 fixed on the flying fuselage 10 and having a first rod 71a rotatably coupled to the bottom surface of the protection member 50 with an end portion thereof, a second cylinder 72 fixed on the flying fuselage 10 at a position facing the first cylinder 71 and having a second rod 72a rotatably coupled to the bottom surface of the protection member 50 with an end portion thereof, a third cylinder 73 fixed on the flying fuselage 10 at a right angle position with respect to the first cylinder 71 and having a third rod 73a coupled to the bottom surface of the protection member 50 with an end portion thereof, and a fourth cylinder 74 fixed on the flying fuselage 10 at a position facing the third cylinder 73 and having a fourth rod 74a rotatably coupled to the bottom surface of the protection member 50 with an end portion thereof.

As the protection member 50 is rotated with respect to the flying fuselage 10, the rotation means is tilted by the expansion and contraction of each of the cylinders and, at this time, the rotor blade units 20 rotate and are tilted with respect to the flying fuselage 10, thereby generating thrust.

In addition, each motor (not shown) for driving and rotating each of the rotor blade units 20 is provided for each of the rotor blade units 20, and the motor is driven by the electricity, which is generated by the engine (not shown) and supplied from a storage battery (not shown).

The rotor blade units 20, the motors, and the storage batteries are provided in four or more respectively so that stable flight can be achieved even if any one of them fails during the flight.

According to the flying object as configured above, the plurality of rotor blade units 20 are provided so that it is possible to prevent the risk of a crash even if any one of the rotor blade units 20 is damaged during the flight, and the rotating rotor blade units 20 can be protected by the protection member 50 from external force and thus prevented from being damaged, thereby preventing the risk of a crash. In addition, even if the engine is stopped, the supply of power by the storage battery is continued, thereby preventing a crash.

Embodiment 8

A flying object according to the eighth embodiment of the present invention, as shown in FIG. 11, includes: a flying fuselage 10 with passengers on board and an engine equipped; a protection member 50 fixed on the upper end portion of the flying fuselage 10 and having a plurality of through-holes 51 formed in the same circumference thereof; each rotor blade unit 20 arranged in each of the through-holes 51 and rotating with the power of the engine; and a rotation means for rotating the protection member 50 with respect to the flying fuselage 10.

Unlike the seventh embodiment, the characteristic configuration of the eighth embodiment is that when the interval between the rotation shafts of the rotor blade units 20 facing each other is A1 and the length of the flying fuselage 10 is C, then C⟩1.5A1.

In this case, the length of the flying fuselage 10 with respect to the protection member 50 is longer than that of the seventh embodiment, thereby further increasing the flight stability.

The rotation means and the rest of the configuration are the same as those of the seventh embodiment, and the detailed description thereof will be omitted.

Embodiment 9

A flying object according to the ninth embodiment of the present invention, as shown in FIG. 12 to FIG. 14, includes a flying fuselage 10 with passengers on board, a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, jet engines 200 respectively arranged in each of the through-holes 51, and a tilting means for tilting each of the jet engines 200 with respect to the protection member 50.

Herein, if it is assumed that the diameter of the protection member 50 is A and the length of the shaft member 30 is B, B⟩A and thus the length of the shaft member 30 is formed to be relatively longer than the diameter of the protection member 50.

In addition, if it is assumed that the height of the flying fuselage 10 is C, B+C⟩1.5A.

In this case, the length of the shaft member 30 is formed to be longer than the diameter of the protection member 50 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the diameter of the protection member 50 so that the flight stability is improved.

In addition, the shaft member 30 is formed as a telescopic cylinder so as to be expandable, so that the flying object can maintain a stable stopping posture and enter the hangar by reducing the length of the shaft member 30 after landing.

The tilting means includes a first actuator 110 mounted on the top surface portion of the protection member 50 and having a first rod 111 capable of protruding and retracting with a free end portion rotatably coupled to the outer surface of the jet engine 200, a second actuator 120 mounted on the bottom surface portion of the protection member 50 at the opposite side of the first actuator 110 and having a second rod 121 capable of protruding and retracting with a free end portion rotatably coupled to the outer surface of the jet engine 200, a third actuator 130 mounted on the top surface portion of the protection member 50 at a right angle position with respect to the first actuator 110 and having a third rod 131 capable of protruding and retracting with a free end portion rotatably coupled to the outer surface of the jet engine 200, and a fourth actuator mounted on the bottom surface portion of the protection member at the opposite side of the third actuator 130 and having a fourth rod capable of protruding and retracting with a free end portion rotatably coupled to the outer surface of the jet engine 200.

Meanwhile, as for the jet engines 200, four or more jet engines 200 are provided at a uniform interval so that stable flight can be achieved even if any one of them fails during the flight.

Referring to FIG. 14(*a*) and FIG. 14(*b*), by the tilting means described above, the jet engine 200 is tilted by the operations of the first and second actuators 110, 120 with respect to the third and fourth rods 131, 141, thereby generating thrust.

According to the flying object as configured above, the plurality of jet engines 200 are provided so that it is possible to prevent the risk of a crash even if any one of the jet engines 200 is damaged during the flight, and the jet engines 200 can be protected by the protection member 50 from external force and thus prevented from being damaged, thereby preventing the risk of a crash.

Embodiment 10

Referring to FIG. 15, a flying object according to the tenth embodiment of the present invention includes a flying fuselage 10 with passengers on board, a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, jet engines 200 respectively arranged in each of the through-holes 51, and a tilting means for tilting each of the jet engines 200 with respect to the protection member 50.

Herein, compared with the ninth embodiment, the tenth embodiment has the characteristic configuration in that if it is assumed that the interval between the jet engines 200 is A1 and the length of the shaft member 30 is B, then B⟩A1 and thus the length of the shaft member 30 is formed to be relatively longer than the diameter of the protection member 50.

In addition, if it is assumed that the height of the flying fuselage 10 is C, B+C⟩1.5A1.

In this case, the length of the shaft member 30 is formed to be longer than the interval A1 between the jet engines 200 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the interval A1 between the jet engines 200 so that the flight stability is improved.

The tilting means and the rest of the configuration are the same as those of the ninth embodiment, and the detailed description thereof will be omitted.

Embodiment 11

Referring to FIG. 16, a flying object according to the eleventh embodiment of the present invention includes a flying fuselage 10 with passengers on board, a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, jet engines 200 respectively arranged in each of the through-holes 51, and a rotation means for rotating the protection member 50 with respect to the shaft member 30.

Herein, if it is assumed that the diameter of the protection member 50 is A and the length of the shaft member 30 is B, then B⟩A and thus the length of the shaft member 30 is formed to be relatively longer than the diameter of the protection member 50.

In addition, if it is assumed that the height of the flying fuselage 10 is C, B+C⟩1.5A.

In this case, the length of the shaft member 30 is formed to be longer than the diameter of the protection member 50 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the diameter of the protection member 50 so that the flight stability is improved.

In addition, the shaft member 30 is formed as a telescopic cylinder so as to be expandable, so that the flying object can maintain a stable stopping posture and enter the hangar by reducing the length of the shaft member 30 after landing.

Meanwhile, as for the jet engines 200, four or more jet engines 200 are provided at a uniform interval so that stable flight can be achieved even if any one of them fails during the flight.

The rotation means is the same as that of the third embodiment, and the detailed description thereof will be omitted.

Embodiment 12

The twelfth embodiment has the same configuration as the eleventh embodiment. Referring to FIG. 17, a flying object according to the twelfth embodiment of the present invention includes a flying fuselage 10 with passengers on board, a shaft member 30 upwardly erected with a lower end portion fixed to the flying fuselage 10, a plate-shaped protection member 50 fixed at the center portion thereof to the upper end portion of the shaft member 30 and having a plurality of through-holes 51 formed in the same circumference thereof, jet engines 200 respectively arranged in each of the through-holes 51, and a rotation means for rotating the protection member 50 with respect to the shaft member 30.

The twelfth embodiment has the characteristic configuration in that if it is assumed that the interval between the jet engines 200 facing each other is A1 and the length of the shaft member 30 is B, then B⟩A1.

In addition, if it is assumed that the height of the flying fuselage 10 is C, B+C⟩1.5A1.

In this case, the length of the shaft member 30 is formed to be longer than the interval A1 between the jet engines 200 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the interval A1 between the jet engines 200 so that the flight stability is improved.

The rotation means and the rest of the configuration are the same as those of the eleventh embodiment, and the detailed description thereof will be omitted.

Embodiment 13

A flying object according to the thirteenth embodiment of the present invention, as shown in FIG. 18, includes a flying fuselage 10 with passengers on board, which is formed to be vertically elongated; a protection member 50 fixed on the upper end portion of the flying fuselage 10 and having a plurality of through-holes 51 formed in the same circumference thereof; each jet engine 200 arranged in each of the through-holes 51; and a tilting means for tilting each of the jet engines 200 with respect to the protection member 50.

The thirteenth embodiment has the characteristic configuration in that the flying fuselage 10 with passengers on board and the engine equipped is directly connected to the protection member 50 and when assuming that the diameter of the protection member is A and the length of the flying fuselage 10 is C, C⟩1.5A.

In this case, the length of the flying fuselage 10 is formed to be longer than the diameter of the protection member 50 so that the vibration transmitted to the flying fuselage 10 according to the operation of the jet engines 200 is reduced as compared with that of the prior art flying object, and the heavy flying fuselage 10 where passengers and an engine are located is positioned below the jet engines 200 and the protection member 50 with an interval equal to or larger than the diameter of the protection member 50, thereby improving the flight stability.

Particularly, since the ceiling of the flying fuselage 10 is formed to be high, it is advantageous to install a sound absorbing material (not shown) and to secure a boarding space for passengers standing.

The tilting means and the rest of the configuration are the same as those of the ninth embodiment, and the detailed description thereof will be omitted.

Embodiment 14

A flying object according to the fourteenth embodiment of the present invention, as shown in FIG. 19, includes: a flying fuselage 10 with passengers on board, which is formed to be vertically elongated; a protection member 50 fixed on the upper end portion of the flying fuselage 10 and having a plurality of through-holes 51 formed in the same circumference thereof; each jet engine 200 arranged in each of the through-holes 51; and a tilting means for tilting each of the jet engines 200 with respect to the protection member 50.

The fourteenth embodiment has the characteristic configuration in that the flying fuselage 10 with passengers on board and the engine equipped is directly connected to the protection member 50 and if it is assumed that the interval between the jet engines 200 facing each other is A1 and the length of the flying fuselage 10 is C, then C⟩1.5A1.

In addition, if it is assumed that the height of the flying fuselage 10 is C, B+C⟩1.5A1.

In this case, the length of the flying fuselage 10 is formed to be longer than the interval A1 between the jet engines 200 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the interval A1 between the jet engines 200 so that the flight stability is improved.

Particularly, since the ceiling of the flying fuselage 10 is formed to be high, it is advantageous to install a sound absorbing material (not shown) and to secure a boarding space for passengers standing.

The tilting means and the rest of the configuration are the same as those of the ninth embodiment, and the detailed description thereof will be omitted.

Embodiment 15

A flying object according to the fifteenth embodiment of the present invention, as shown in FIG. 20, includes a flying fuselage 10 with passengers on board, a plate-shaped protection member 50 fixed at the center portion thereof to the upper end portion of the flying fuselage 10 and having a plurality of through-holes 51 formed in the same circumference thereof, jet engines 200 respectively arranged in each of the through-holes 51, and a rotation means for rotating the protection member 50 with respect to the flying fuselage 10.

Herein, if it is assumed that the diameter of the protection member 50 is A and the length of the flying fuselage 10 is C, then C⟩1.5A, wherein the length of the flying fuselage 10 is formed to be relatively longer than the diameter of the protection member 50 and the flying fuselage 10 with passengers on board and the engine equipped is directly connected to the protection member 50.

In this case, the length C of the flying fuselage 10 is formed to be longer than the diameter A of the protection member 50 so that the vibration transmitted to the flying fuselage 10 according to the operation of the jet engines 200 is reduced as compared with that of the prior art flying object, and the ceiling of the flying fuselage 10 is formed to be high such that it is advantageous to install a sound absorbing material (not shown) and to secure a boarding space for passengers standing.

Meanwhile, as for the jet engines 200, four or more jet engines 200 are provided at a uniform interval so that stable flight can be achieved even if any one of them fails during the flight.

The rotation means is the same as that of the seventh embodiment, and the detailed description thereof will be omitted.

Embodiment 16

The sixteenth embodiment has the same configuration as the fifteenth embodiment. Referring to FIG. 21, a flying object includes a flying fuselage 10 with passengers on board, a plate-shaped protection member 50 fixed at the center portion thereof to the upper end portion of the flying fuselage 10 and having a plurality of through-holes 51 formed in the same circumference thereof, jet engines 200 respectively arranged in each of the through-holes 51, and a rotation means for rotating the protection member 50 with respect to the flying fuselage 10.

The sixteenth embodiment has the characteristic configuration in that if it is assumed that the interval between the jet engines 200 facing each other is A1 and the length of the flying fuselage 10 is C, then C⟩1.5A1.

In this case, the length of the flying fuselage 10 is formed to be longer than the interval A1 between the jet engines 200 so that the vibration transmitted to the flying fuselage 10 according to the operation of the jet engines 200 is reduced as compared with that of the prior art flying object, and the heavy flying fuselage 10 where the passengers and the equipped engine are located is positioned below the jet engines 200 and the protection member 50 with an interval equal to or larger than the interval A1 between the jet engines 200 so that the flight stability is improved.

The rotation means and the rest of the configuration are the same as those of the fifteenth embodiment, and the detailed description thereof will be omitted.

The invention claimed is:

1. A flying object, comprising:
   a flying fuselage;
   a shaft member upwardly erected with a lower end portion fixed to the flying fuselage;
   a plate-shaped protection member having a center portion fixed to an upper end portion of the shaft member and having a plurality of holes that each are located at an equal radial distance from a center of the plate-shaped protection member;
   a plurality of driving means, each of the plurality of driving means being arranged in a corresponding one of the plurality of holes; and
   a rotation means for rotating the plate-shaped protection member with respect to the shaft member,
   wherein each of the plurality of driving means is a jet engine or a rotor blade unit, and
   wherein a diameter of the plate-shaped protection member is A, two driving means of the plurality of driving means are located opposite with respect to the center of the plate-shaped protection member and an interval between centers of the two driving means is A1, a length of the shaft member is B, and a formula B>A or B>A1 is satisfied.

2. The flying object according to claim 1, wherein the shaft member is formed from a telescopic cylinder so as to be expanded and contracted.

3. The flying object according to claim 1, wherein the plurality of holes and the plurality of driving means are arranged such that four or more of the plurality of holes and four or more of the plurality of driving means are arranged at equal intervals along a circumferential direction of the plate-shaped protection member, respectively.

4. The flying object according to claim 1, wherein the rotation means includes:
- a first cylinder fixed on the shaft member and having a first rod rotatably coupled to a bottom surface of the protection member with an end portion thereof;
- a second cylinder fixed on the shaft member at a position facing the first cylinder and having a second rod rotatably coupled to the bottom surface of the protection member with an end portion thereof;
- a third cylinder fixed on the shaft member at a right angle position with respect to the first cylinder and having a third rod coupled to the bottom surface of the protection member with an end portion thereof; and
- a fourth cylinder fixed on the shaft member at a position facing the third cylinder and having a fourth rod rotatably coupled to the bottom surface of the protection member with an end portion thereof.

5. The flying object according to claim 1, wherein if the height of the flying fuselage is C, B+C>1.5A or B+C>1.5A1.

6. The flying object according to claim 5, wherein the rotation means includes:
- a first cylinder fixed on the shaft member and having a first rod rotatably coupled to a bottom surface of the protection member with an end portion thereof;
- a second cylinder fixed on the shaft member at a position facing the first cylinder and having a second rod rotatably coupled to the bottom surface of the protection member with an end portion thereof;
- a third cylinder fixed on the shaft member at a right angle position with respect to the first cylinder and having a third rod coupled to the bottom surface of the protection member with an end portion thereof; and
- a fourth cylinder fixed on the shaft member at a position facing the third cylinder and having a fourth rod rotatably coupled to the bottom surface of the protection member with an end portion thereof.

\* \* \* \* \*